United States Patent [19]
Farnsworth

[11] Patent Number: 4,854,521
[45] Date of Patent: * Aug. 8, 1989

[54] FENCING WIRE UNWINDER AND TENSIONER

[76] Inventor: Fred L. Farnsworth, 4635 W. 5100 South, Hooper, Utah 84315

[*] Notice: The portion of the term of this patent subsequent to Oct. 4, 2005 has been disclaimed.

[21] Appl. No.: 219,089

[22] Filed: Jul. 14, 1988

Related U.S. Application Data

[63] Continuation-in-part of Ser. No. 408,725, Aug. 17, 1982.

[51] Int. Cl.⁴ ............................................. B65H 59/16
[52] U.S. Cl. ................................... 242/86.5 R; 256/1; 256/2; 226/195
[58] Field of Search ...................... 242/54, 55, 75, 75.2, 242/75.4, 75.53, 76, 86.5 R, 86.8, 85; 226/195; 256/1, 2; 254/361, 389

[56] References Cited
U.S. PATENT DOCUMENTS
4,775,114 10/1988 Farnsworth ................... 242/86.5 R Primary Examiner—Stuart S. Levy
Assistant Examiner—Steven M. du Bois
Attorney, Agent, or Firm—A. Ray Osburn

[57] ABSTRACT

A fencing wire unwinder and tensioner for constructing wire fences, the apparatus comprising a carrying platform for spools and rolls of fencing wire, whereby the wire is unwound and tensioned in a single operation for attachment to the preset posts of the fence. The device may be adapted for barbed wire only, woven wire only, and chain link only, or barbed wire along with either of the latter. Spools of barbed wire strand and/or rolls of woven or chain link wire are carried rotatably on a platform, the wire being fastened to the fence and unwound therealong as the platform is carried along the fence line by the vehicle. The wire unwound from the roll is tensioned by braking band before leaving the platform. Helpers follow the platform and attach the fencing in tensioned condition to the preset line of posts. According to one aspect of the invention, a hydraulically operated locking device holds the woven and chain link wire in tensioned condition while a fresh roll thereof is attached for subsequent unwinding and tensioning.

13 Claims, 6 Drawing Sheets

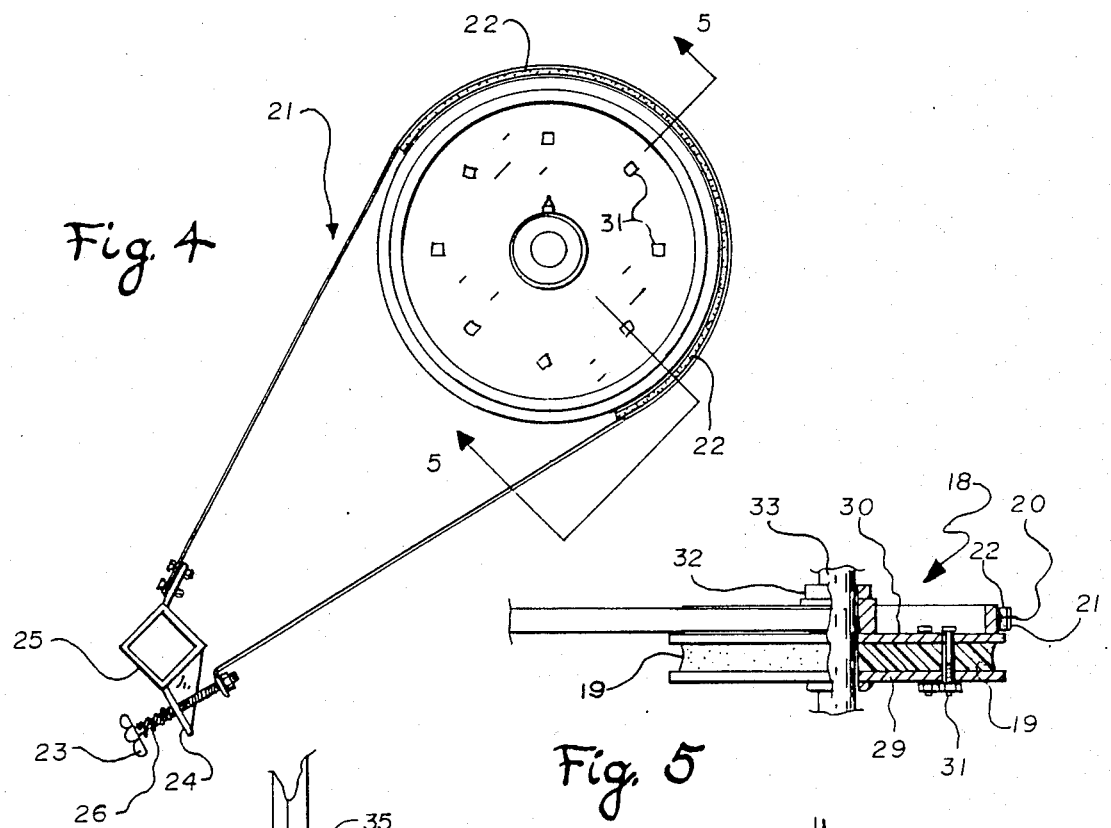
Fig. 4
Fig. 5
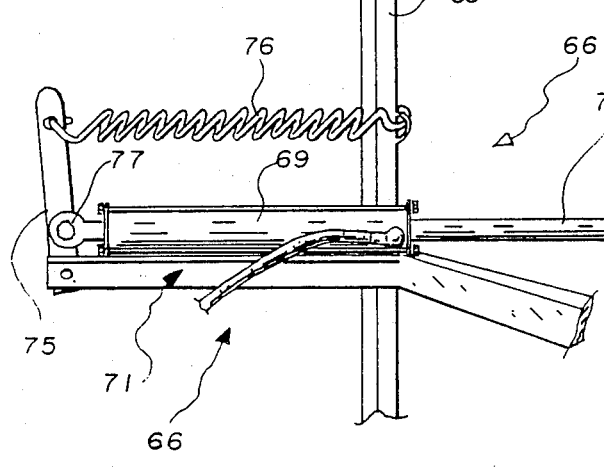
Fig. 8
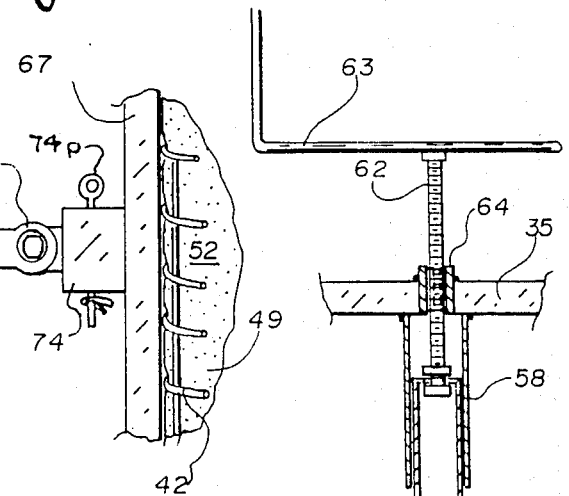
Fig. 9
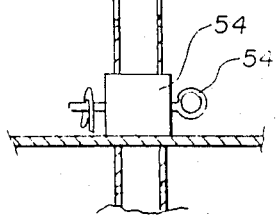

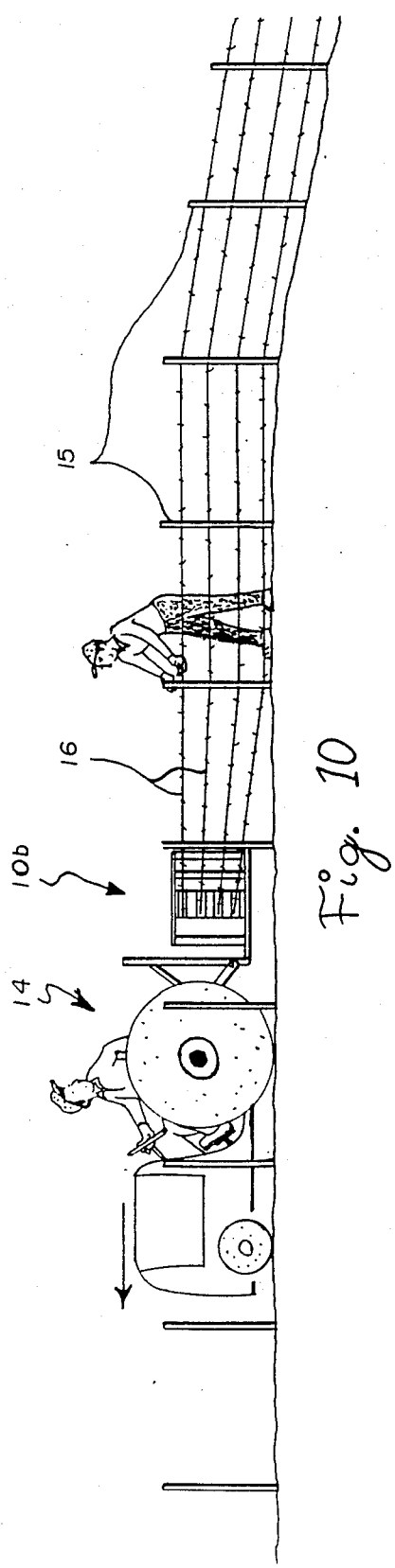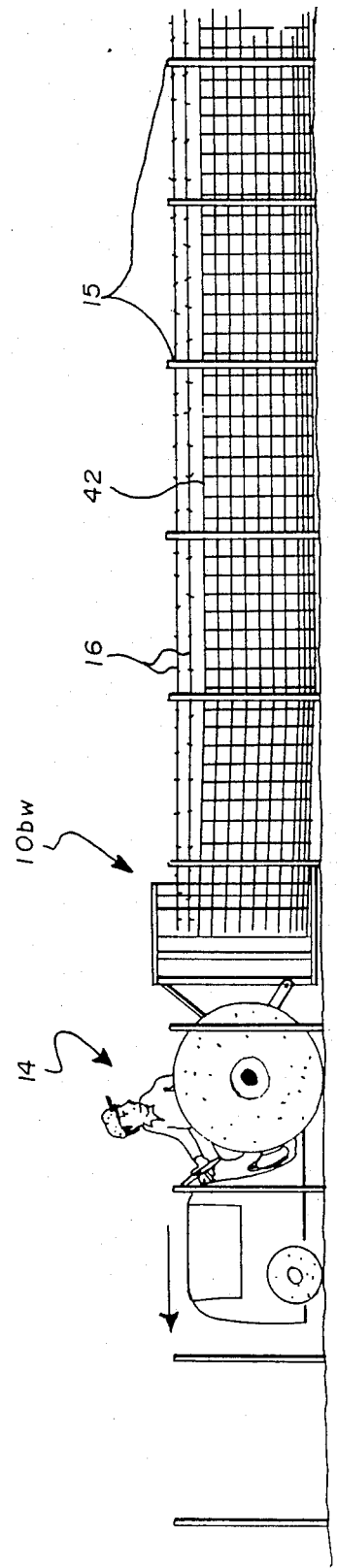

FENCING WIRE UNWINDER AND TENSIONER

RELATED APPLICATIONS

This application is a continuation-in-part application based on co-pending parent application entitled FENCING WIRE UNWINDER AND TENSIONER, of Fred L. Farnsworth filed Aug. 17, 1982, Ser. No. 06/408,725.

BACKGROUND OF THE INVENTION

1. Field

The field of the invention is devices for constructing farm fences, particularly those comprising woven wire and chain link and/or barbed wire attached to spaced apart posts. With more particularity, the field is devices for unwinding such fencing wire from rolls or spools and tensioning it properly for attachment to the posts.

2. State of the Art

Most commonly, fencing, whether of barbed, woven wire or chain link, is unwound by rolling the spool or roll along a line of preset support posts leaving the fencing unrolled along the ground, attaching its end to a suitable post and then tensioning (stretching) it for attachment to the other posts. It is stretched by clamping the free end of the fencing and pulling upon it using a vehicle, a winch, a block and tackle, or manual levers or the like. Only limited lengths of fencing may be stretched by these procedures. Each length must be permanently attached to the posts before the next length of fence is constructed, and firm anchoring posts are required at both ends of each length. Numerous devices have been conceived to facilitate the initial unwinding of the fencing material along the post line. U.S. Pat. No. 444,219 discloses a cart rotatably carrying a spool of fencing material and moved along the post line to unwind the strand of wire. A ratcheted windless is then used in a separate operation to stretch the wire before attachment to the posts. U.S. Pat. No. 643,919 discloses a similar device, being adapted however to simultaneously unwind several barbed wire strands. For stretching after the unwinding, wire clamps secure each separate strand to a separate ratcheted winch for each strand of wire. U.S. Pat. No. 567,213 discloses another but similar device, this one being sled mounted. A braking member 22 is used to prevent "runaway" of the wire spool during rapid unwinding of the wire. It is retracted before the subsequent tensioning operation. The stretching appears to be done by using the wire spool itself as the spool of a windless. U.S. Pat. No. 802,579 discloses another arrangement for first unwinding a length of fencing wire and then tightening the separate strands by separate windlesses. Not shown in the prior art is any device which unwinds and stretches the fencing material in a single continuous operation, so that it may be successively attached to successive posts as it is unwound along the fence post line. The prior art, therefore, requiring separate unwinding and stretching operations, is not highly expedient, especially for constructing long fences.

BRIEF SUMMARY OF THE INVENTION

With the foregoing in mind, the disadvantages in the prior art are eliminated or substantially alleviated by providing a device capable of substantially simultaneous unwinding and tensioning the fencing material along a preset line of posts, so that it may be immediately secured in tensioned condition to the successive posts. With the device, the fence building operation is substantially continuous, stops only being needed to connect full rolls or spools of fencing material to those depleted. Embodiments of the device, may be adapted for barbed wire, woven wire, or chain link, or for simultaneous utilization of barbed wire with either.

Spindles or the like are provided to carry spools or rolls of fencing material rotatably upon a platform or the like. The free end of the wire of a roll or spool is secured to an end post or the like in a preset line of posts, and the platform then carried therealong by a suitable vehicle to unwind and draw the wire from the spindle mounted spools or rolls, preferably first about rotatable guide drums, about adjustably braked tensioning discs (barbed wire) or a tensioning drum (woven wire or chain link). The frictional brakes are adjustable to provide the desired tension in the wire for a tight fence. For fences of barbed wire, separate brake discs for each strand are preferable. A cylindrical portion of each disc is preferably constructed of resilient, non-slip material. To adjustably brake the strand, another portion may comprise a brake drum engaged by a brake shoe upon a brake band arranged to be adjustably tensioned to adjust the braking force. For woven wire and chain link fencing, an elongate cylindrical braking drum is provided, preferably surfaced with resilient non-slip material. Again, the drum may be braked by a tensioned strap with attached braking shoe.

The woven wire and chain link fencing must generally be pretensioned to tighten it against the braking drum to produce sufficient friction to prevent slippage. Two guiding drums are preferably provided, the woven wire being forced to bend about one and then reversely about the other before being again bent about the braking drum. For additional pretension it is preferred that the woven wire and chain link also be longitudinally clamped between a pair of roll plates to provide friction against the rotating roll ends as the wire is unwound. However, for some applications, the roll clamping provisions are not necessary.

For woven wire and chain link fencing, it is advantageous to provide a braking drum locking device, so that the wire of depleted rolls may be retained in tension while the end of a full roll is attached thereto. One advantageous and effective drum locking device comprises a hydraulic cylinder and ram, which forces an elongate locking bar against the resilient surface of the drum, locking the drum from rotation and firmly clamping the wire against the drum.

In the embodiment for handling woven, chain link and barbed wire, the spools of barbed wire may be conveniently held upon spindles upstanding from the upper roll plate.

The inventive device allows continuous installation of virtually entire spools and rolls of fencing wire, woven, chain link and barbed, without intermediate stops. The embodiment for both woven or chain link and barbed wire may be used individually for either, as well as for the simultaneous installation of both woven wire or chain link and barbed wire strands in a single fence construction.

The carrying platform may be adapted to be transported along the fence line by any suitable vehicle, such a a farm tractor. It is advantageous for the platform to be carried upon a carrying frame cantilevered backwardly from the tractor, and raised and lowered hydraulically. The platform could of course be supported upon wheels, sled runners or the like and drawn along the fence line by a suitable vehicle, without departing from the essential spirit of the invention.

BRIEF DESCRIPTION OF THE DRAWINGS

In the drawings, which represent the best mode currently contemplated for carrying out the invention.

DETAILED DESCRIPTION OF ILLUSTRATED EMBODIMENTS

Figure 1:
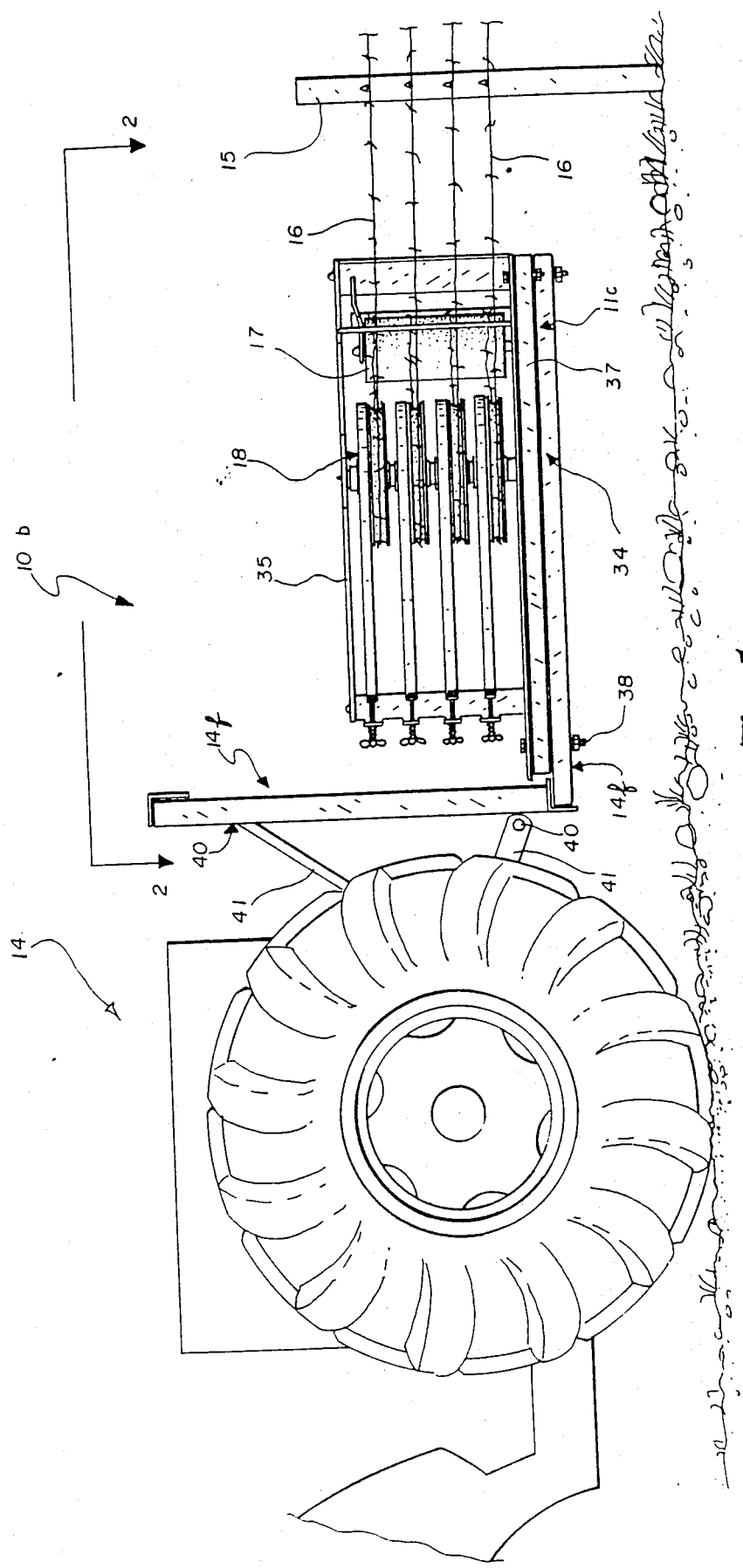
FIG. 1 is a side elevation view of an embodiment of the fencing wire unwinder and tensioner in accordance with the invention, adapted for barbed wire only, partially showing a transporting vehicle therefor, FIG. 2 a top plan view of the wire unwinder and tensioner of FIG. 1, taken along line 2—2 thereof, drawn to the same scale, FIG. 3 a rear elevation view of the unwinder and tensioner of FIG. 2 taken along line 3—3 thereof, drawn to the same scale, FIG. 4 a top plan view of a barbed wire strand tensioning disc and braking band therefor, drawn to an enlarged scale, FIG. 5 a side elevation view, partially sectioned, of the braking disc of FIG. 4 taken along line 5—5 thereof, drawn to the same scale, FIG. 6 a top plan view of an embodiment of the unwinder/tensioner in accordance with the invention adapted for both barbed wire and woven wire, drawn to the scale of FIG. 1, FIG. 7 a side elevation view of the embodiment of the unwinder/tensioner of FIG. 6, taken along line 7—7 thereof, drawn to the same scale, FIG. 8 an elevation view of a fragment of the embodiment of FIG. 6 showing the woven wire locking mechanism thereof, taken along line 8—8 thereof, drawn to an enlarged scale, FIG. 9 a fragment of the embodiment of FIG. 6 showing the screw crank roll clamping device thereof, taken along line 9—9 of FIG. 6, drawn to an enlarged scale, FIG. 10 a reduced scale representation of the barbed wire unwinder/tensioner of FIG. 1 in operation, FIG. 11 a reduced scale representation of the unwinder/tensioner adapted for both woven and barbed wire, in operation, and FIG. 12 a side elevation view of a fragment of the unwinder/tensioner of FIG. 7, wherein chain link fencing material is utilized, drawn to the same scale of FIG. 7.
Figure 2:
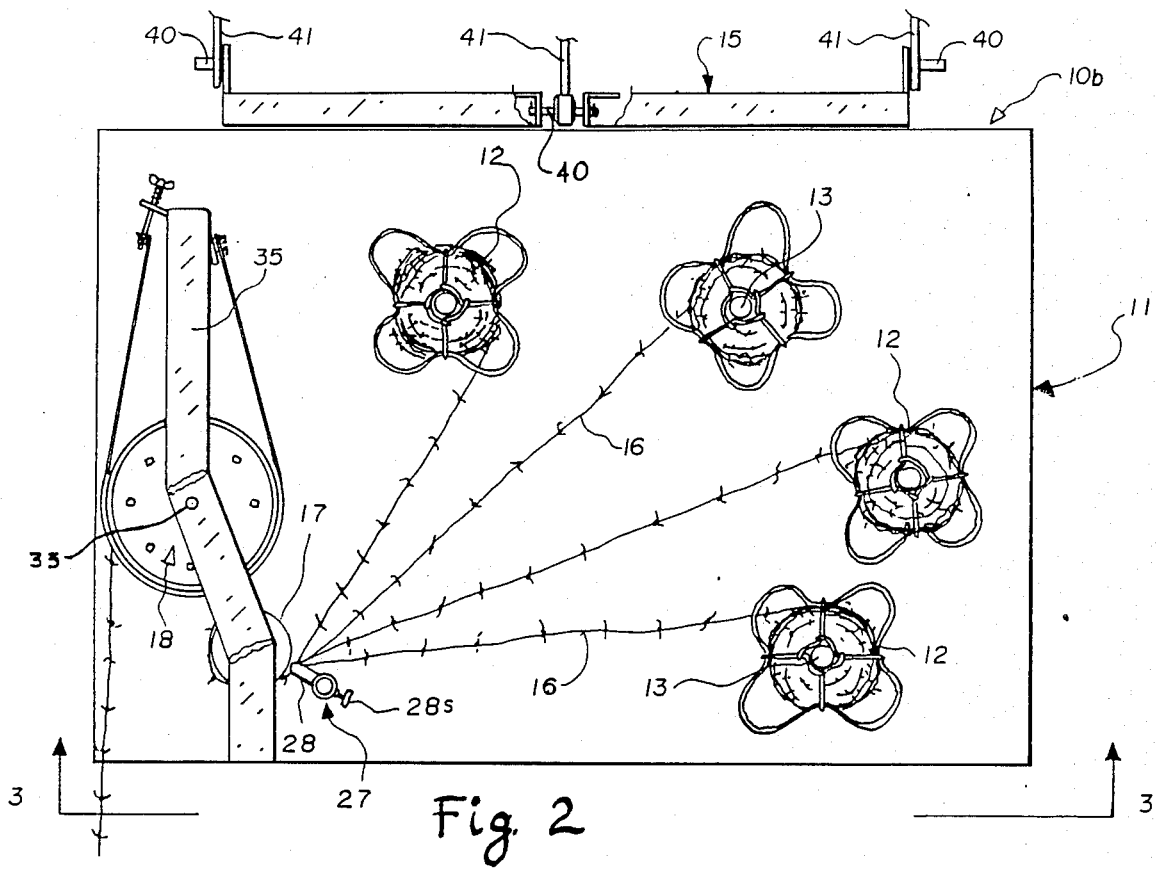
Figure 3:
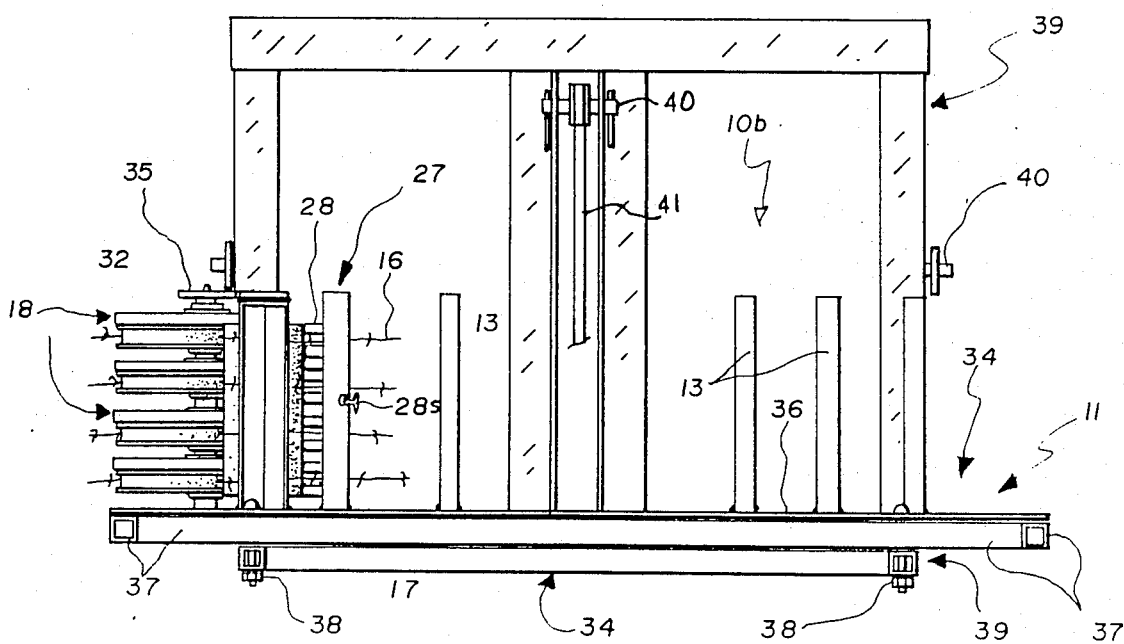

In the drawings, fencing wire unwinder and tensioner 10 is illustrated in FIGS. 1-5 and 10 in an embodiment 10b adapted for barbed wire, and in FIGS. 6-9 and 11 in an embodiment 10b,w adapted for simultaneous unwinding and tensioning of both woven and barbed wire. A third embodiment adapted for woven wire only, is not specifically illustrated in detail, all of its structure being included in 10b,w but is well within the spirit of the invention. The embodiment 10b,w illustrated in FIGS. 6-9 and 11 may be separately utilized for either barbed or woven wire.

Barbed wire stretcher 10b comprises a platform 11 carrying spools 12 of barbed wire rotatably upon spindles 13 upstanding from the platform 11. (FIGS. 1-3) Platform 11 is adapted to be carried, for example, by a tractor 14 upon a carrying frame 14f along a line of preset fence posts 15. A strand 16 from each spool is guided about a rotatably mounted vertical guide drum 17 and a braking disc 18, and its free end attached, for instance, to the first one of the line of posts 15. One or more helpers follow tractor 14 to attach each strand 16, unwound from spools 12 and tensioned by brake disc 18, to successive preset posts 15. (FIG. 10) The strands 16 are easily raised or lowered to their exact heights for attachment to each post 15. The strands 16 are thus very rapidly unwound, tensioned and attached to build a tight fence along posts 15. Also, platform 11 on tractor 14 automatically adjusts to any horizontal or vertical curvatures in the line of posts 15. (FIG. 10)

Guide drum 17 is preferably positioned to guide strand 16 to contact its respective brake disc 18 over at least one half its circumference, to assure firm frictional contact. (FIGS. 4 & 5) A lower portion 19, made of resilient material, provides substantially non-slip friction with the twisted wires and the barbs of the strand 16. An upper cylindrical braking drum portion 20 is adjustably restrained from rotation by a tensioned brake strap 21 with a shoe 22. Tension on strap 21 is adjusted by a wing bolt 23 threaded to a bracket 24 on brake post 25, and acting on a compression spring 26. By adjustment of the braking force upon drum 20 using wing bolt 23, the tension in unwinding strand 16 is maintained as necessary to construct a taut fence. A rotatably retractable guide 27 with comb-like teeth 28 directs the strands 16 without tangling from the various spools 12 onto guide drum 17. (FIGS. 2 & 3) Note guide set bolt 28s.

When a spool 12 is depleted, tractor 14 is stopped and the free end of the strand 16 of a full spool is attached to continue the fence building operation Strand 16 of the depleted spool is firmly held near its end by friction with braking disc 18 during the splicing Any slack in the splice is tightened as the operation continues.

The detailed construction of braking disc 18 and brake band 21 are best seen in FIGS. 4 & 5. A lower and an upper plate, 29 and 30 respectively, are secured by spaced bolts 31 to retain the friction disc 19, which may, for example, be punch sheared from one inch conveyor belting material. The cylindrical brake drum 20 upstands from upper plate 30. Bearing block 32 permits braking disc 18 to rotate about disc post 33, which is secured between platform base 34 and upper frame member 35. (FIGS. 2 & 3) Friction disc 19 may be replaced periodically, by removal of bolts 31, as it is worn away by the barbs and wires of strands 16.

Platform 11, which may comprise ¼" steel plate 36 stiffened by 2" square tubes 37, is adapted to be secured as by bolts 38 to the tractor carrying frame 14f. (FIGS. 1 & 3) Pivot pins 40 engage tractor attachment arms 41, which are linked to the hydraulic system of tractor 14 so that frame 39 and platform 11 may be raised and lowered to position unwinder and tensioner 10 at selected elevations above the ground, and allowed to rest upon the ground for attachment and removal from tractor 14.

Embodiment 10b,w of fence dispenser/stretcher 10 is adapted for both woven wire and barbed wire. (FIGS. 6-9, 11) Rolls 42 of woven wire carried between upper and lower roll compression plates 43 and 44 respectively, rotate about upper and lower stub guides 45 and 46 respectively as the wire is unwound. Upper stub guides 45 may be conveniently removed manually from bores through upper plate 43, to facilitate installation of woven wire rolls 42. Fencing 42 is guided about a pair of elongate rotatable guide drums 47 and 48 and thence about an elongate braking drum 49, which has an integral braking drum 50 and an associated braking band 51.

(FIGS. 6 & 7) As with barbed wire embodiment 10b, helpers attach wire 42 fed from platform 11 to a preset line of fence posts 15.

Drum 49 has a thick surface layer of resilient material 52 to provide substantial friction with the individual strands and ties of woven fencing 42. Guide drum 48 is positioned to cause wire 42 to contact about one half the circumference of brake drum 49. However, unless it is very tightly held against resilient surface 52 of drum 49, woven wire is difficult to tension sufficiently The forcible flexing of the woven wire 42 about guide drums 47 and 48 may not always sufficiently tighten it. Additional tightening is provided by compressing the ends of the rolls between upper and lower roll plates 43 and 44. Lower plate 44 is supported upon compression springs 53. Plate 43 is secured to a central hub 54 which is selectively positioned by pin 54p along a roll plate post 55 for rolls of fencing of various heights. (FIGS. 7 & 9) Post 55 is slidably associated with an upper guide sleeve 58 attached to upper frame member 35. (Member 35 also secures the upper ends of spindles 59, 60, and 61 associated with guide drums 47 and 48 and brake drum 49 respectively.) Post 55 is engaged by threaded shaft 62 of a crank 63, which also engages the threads of boss 64 secured to upper frame 35. The lower end of shaft 62 is adapted to raise or lower post 55 as crank 63 is turned, so that plate 43 may be pressed downwardly upon the upper ends of wire rolls 42. Lower plate 44 then presses against yielding springs 53. Because of friction between plates 43 and 44 and the ends of rolls 42, the woven fencing is partially tensioned as it is unwound, to tighten it sufficiently against drum 49. Since considerable frictional wear would be imposed upon the surfaces of the upper and lower spool plates, it is desirable that replaceable wear plates 65 be provided.

When a roll 42 is depleted, it is desirable to connect a full roll 42 to its end without releasing the tension upon the wire already strung upon the posts 15. Unlike the barbed wire strands 16, the end of woven wire 42 cannot be sufficiently held by friction with drum 49, when tractor 14 is stopped. A wire locking assembly 66 (FIG. 8) may be provided, comprising a braking drum locking bar 67, a locking bar guide 68 secured to bottom plate 36 of platform 11, and a hydraulic cylinder 69 with ram 70 suitably secured by a cylinder mounting structure 71 to frame 35. Fluid for operating ram 70 is provided by tractor 14. Ram 70 is connected through clevis 72 to a pivot member 73 retained as by pin 73p within a sleeve 74 outstanding from locking bar 67. When ram 70 is actuated, locking bar 67 presses the strands of fencing 42 into resilient surface 52, preventing strand slippage, drum rotation, and loss of wire tension. The free end of the new roll 42 is then attached to the free end of the depleted roll 42.

To prevent damage to brake drum 49 from the force of ram 70 it is preferred to provide a cylinder attachment bar 75 pivoted from cylinder mount 71 at one of its ends, and secured as to frame 35 by a tension spring 76 at its other end. Cylinder 69 is pivotally secured through clevis 77 to bar 75. Damage to drum 49 is prevented by yielding of spring 76. With a less forceful cylinder, the spring and bar arrangement could be eliminated, as it also could by providing hydraulic pressure release means to limit the ram force. Or, other mechanical wire and drum locking means could be provided without departing from the spirit of the invention.

Figure 6:
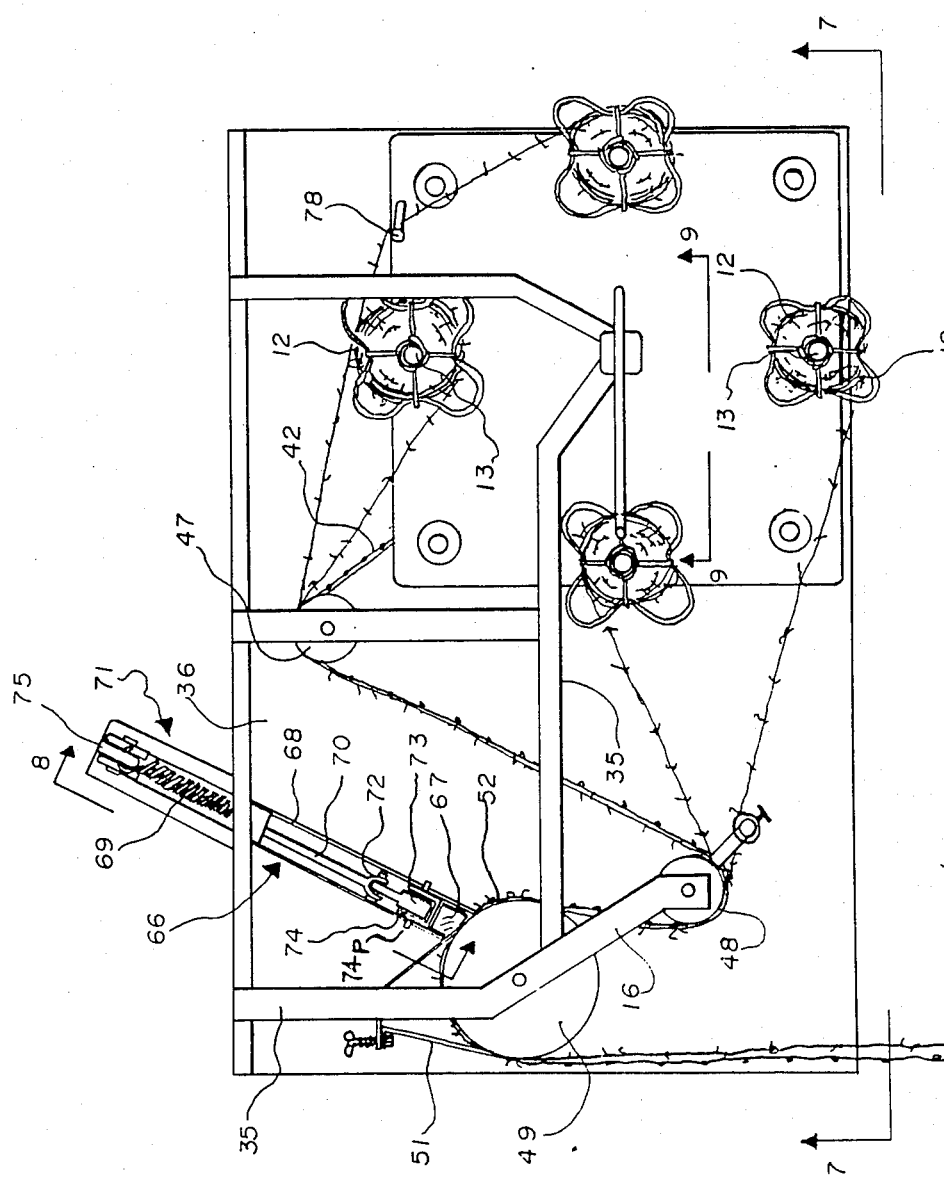
Figure 7:
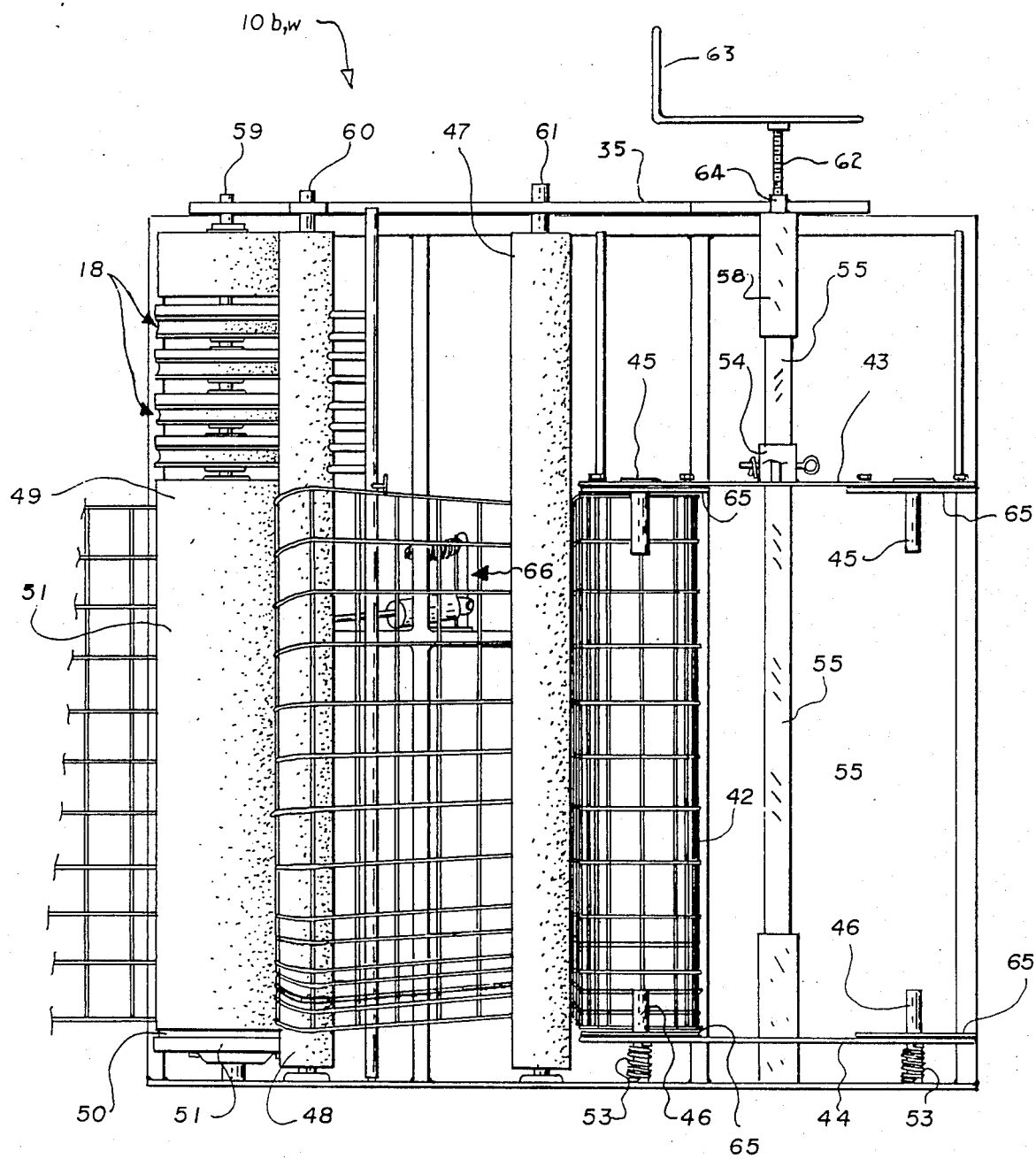

The provisions for barbed wire in embodiment 10b, w are similar to those described in the embodiment 10b for barbed wire alone. The barbed wire spools 12 are conveniently mounted upon upper roll plate 43, so that the strands 16 are unwound generally above the woven wire 42 as required in the fence. Individually rotatable braking discs 18 are provided upon the spindle 59 of drum 49. The discs 18 are adjustably braked as in the embodiment 10b. The barbed strands 16 may be directed about guide drum 47 or about both drums 47 and 48 as convenient to prevent tangling. It may be necessary to provide an additional guide assembly 78. (FIG. 6)

Both woven wire and barbed wire may at the same time be unwound, tensioned, and attached to the preset line of posts 15. (FIG. 11) Embodiment 10b, w may be used for only woven wire or only barbed wire. In the latter case, platform 11 is lowered near to the ground and the individual strands may be vertically displaced by the workers to the proper level for attachment at each post 15.

Unwinder and tensioner 10 may be adapted, without basic alteration, to use rolls 79 of chain link fencing material. (FIG. 12) The chain link rolls 79, as with the woven wire rolls 42, are carried between the plates 43 and 44, and guided about braking drum 49. Since the chain link material flexes freely, pretensioning upon the roll 79 may be of increased importance.

The invention may therefore be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefor intended to be embraced therein.

What is claimed and desired to be secured by United States Letters Patent is:

1. An apparatus for construction of wire fences from rolls of fencing wire, each roll having a free end by which the wire may be unwound from the roll thereof, said apparatus comprising:

generally horizontal platform means adapted to be drawn along over the ground by a vehicle;

means for securing at least one roll of fencing wire rotatably upon the platform, so that the free end of the wire may be attached to a fencing post or the like and the wire unwound from the roll as the platform travels over the ground along a line of such posts; and brake means carried by the platform adapted to continuously tension the unwound portion of the wire after it is unwound from the roll thereof, so that the wire remaining on said roll is not tightened, and so that the wire may be attached in tensioned condition to successive fence posts of the line thereof as the platform is carried along over the ground.

2. The apparatus of claim 1, wherein: the apparatus is adapted for the unwinding and tensioning of chain link fencing material from rolls thereof.

3. The apparatus of claim 2 wherein the brake means comprises:

axle means upstanding from the platform;

elongate braking drum means rotatably mounted upon the axle; and means for adjustably restraining the rotation of the braking drum; so that the chain link fencing material from the roll thereof may be threaded around the braking drum to be frictionally engaged and tensioned thereby as the platform is carried along the fence line.

4. The apparatus of claim 3 wherein:
a longitudinal portion of the braking drum carries on its surface a layer of resilient material to produce substantial friction with the chain link fencing material.

5. The apparatus of claim 4 wherein the rotation restraining means comprises:
a braking band; and
a longitudinal portion of the braking drum adapted to receive the braking band therearound in braking relationship thereto.

6. The apparatus of claim 5 further comprising:
chain link fencing material guide drum means rotatably mounted on the platform, adapted to guide said material from the roll thereof to the braking drum.

7. The apparatus of claim 6 further comprising:
means for pretensioning the chain link fencing material as it is unwound from the roll thereof before final tensioning by the woven wire braking drum.

8. The apparatus of claim 7 wherein the pretensioning means comprises:
a generally horizontal lower roll plate;
at least three compression coil springs, said springs supporting said plate upon the platform;
a generally horizontal upper roll plate;
at least one pair of axially aligned studs, one upstanding from the lower plate and the other downstanding from the upper plate, and adapted to hold a roll of chain link fencing material in place between the upper and the lower plates; and
adjustable means for raising and lowering the upper roll plate so that the rolls of chain link fencing material may be forcibly retained between the plates under compression from the coil springs so as to provide friction upon the ends of the rolls to partially restrain the unwinding of the chain link fencing material therefrom.

9. The apparatus of claim 8 wherein:
said apparatus further comprises frame means secured to the platform; and
the upper plate raising and lowering means comprises screw crank means associated with an upper portion of the frame means.

10. The apparatus of claim 9 further comprising:
at least one spindle upstanding from the upper roll plate, adapted to receive a spool of barbed wire rotatably therearound; and
barbed wire strand braking means; so that
chain link and barbed wire fencing material may be simultaneously tensioned as both are fed from the apparatus as it is carried along the fence line.

11. The apparatus of claim 10 further comprising:
chain link fencing material locking means for holding the unrolled material of a depleted roll thereof in tension during attachment of the material of an undepleted roll thereto.

12. The apparatus of claim 11 wherein the chain link fencing material locking means comprises:
a hydraulic cylinder and ram;
means for mounting said cylinder and ram upon the frame of the apparatus;
an upstanding elongate braking bar attached to the ram of the hydraulic cylinder and disposed to bear against the surface of the chain link fencing material braking drum so as to prevent its rotation and to clamp the chain link material thereagainst.

13. The apparatus of claim 12 wherein:
the means mounting the cylinder upon the frame of the apparatus includes a bar secured in pivotal relation thereto;
means pivotally securing the cylinder to said bar; and
spring means acting between said frame and said bar; so that
the force of the braking bar upon the chain link fencing material braking drum is limited by deflection of said spring means.

* * * * *